United States Patent
Lee et al.

(10) Patent No.: US 7,307,958 B2
(45) Date of Patent: Dec. 11, 2007

(54) TUNNELLING WIRELESS VOICE WITH SOFTWARE-DEFINED VOCODERS

(75) Inventors: William C. Y. Lee, Danville, CA (US); Jau Young Lee, Pleasanton, CA (US)

(73) Assignee: Cello Partnership, Bedminster, NJ (US)

( * ) Notice: Subject to any disclaimer, the term of this patent is extended or adjusted under 35 U.S.C. 154(b) by 932 days.

(21) Appl. No.: 09/733,480

(22) Filed: Dec. 7, 2000

(65) Prior Publication Data

US 2002/0071396 A1 Jun. 13, 2002

Related U.S. Application Data

(60) Provisional application No. 60/169,814, filed on Dec. 8, 1999.

(51) Int. Cl.
*H04J 9/00* (2006.01)
*H04J 3/22* (2006.01)

(52) U.S. Cl. .............. 370/252; 370/401; 370/464; 370/465

(58) Field of Classification Search ........... 370/252, 370/310, 328, 352–353, 356, 358, 401, 464–467, 370/477; 709/221, 228
See application file for complete search history.

(56) References Cited

U.S. PATENT DOCUMENTS

| | | | | |
|---|---|---|---|---|
| 6,002,999 A * | 12/1999 | Han et al. | .................... | 704/201 |
| 6,181,734 B1 * | 1/2001 | Palermo | ..................... | 375/219 |
| 6,493,325 B1 * | 12/2002 | Hjalmtysson et al. | ....... | 370/261 |
| 6,577,637 B1 * | 6/2003 | Sieppi | ........................ | 370/401 |
| 6,580,906 B2 * | 6/2003 | Bilgic et al. | ............. | 455/422.1 |
| 6,587,684 B1 * | 7/2003 | Hsu et al. | ................... | 455/419 |

* cited by examiner

*Primary Examiner*—Chi Pham
*Assistant Examiner*—Saba Tsegaye
(74) *Attorney, Agent, or Firm*—Gates & Cooper LLP

(57) ABSTRACT

Vocoding conversions are reduced by dynamically loading a software-defined vocoder into a handset. The software-defined vocoder may be selected based on the calling party's network type, wherein a notification of network type is transmitted to the called party's network during call setup. The software-defined vocoders may be stored in the network and downloaded into the handset; alternatively, the software-defined vocoders may be stored in the handset. Voice data is tunneled from the calling party's handset and the calling party's network, through any number of different networks, to the called party's network and called party's handset, without any vocoding conversions, except at the handsets.

24 Claims, 6 Drawing Sheets

TUNNELLING WIRELESS VOICE WITH SOFTWARE-DEFINED VOCODERS

CROSS REFERENCE TO RELATED APPLICATIONS

This application claims priority under 35 U.S.C. § 119(e) to U.S. Provisional Patent Application No. 60/169,814, filed Dec. 8, 1999, by William C. Y. Lee and David J. Y. Lee, and entitled "CELLULAR IP FEATURES AND PROTOCOLS," which application is incorporated by reference herein.

This application is related to the following co-pending and commonly-assigned U.S. patent applications:

Ser. No. 09/733.549, filed on Dec. 7, 2000, by Jau Young Lee and William C. Y. Lee, entitled "QUALITY OF SERVICE ENHANCEMENTS FOR WIRELESS COMMUNICATIONS SYSTEMS", Lee, entitled "TUNNELLING VOICE OVER THE INTERNET PROTOCOL IN A CELLULAR NETWORK,";

Ser. No. 09/590,346, filed Jun. 8, 2000, by David J. Y. Lee, Ce Xu, and William C. Y. Lee, entitled "MOBILE INTERNET PROTOCOL SQUARE"; and Ser. No. 09/589,974, filed Jun. 8, 2000, by David J. Y. Lee, Ce Xu, and William C. Y. Lee, entitled "ARCHITECTURE OF INTERNET PROTOCOL-BASED CELLULAR NETWORKS";

all of which applications are incorporated by reference herein.

BACKGROUND OF THE INVENTION

1. Field of the Invention

The present invention relates to wireless voice systems, and, in particular, to tunneling wireless voice data over various networks using software-defined vocoders.

2. Description of the Related Art

With the Internet and the associated Internet Protocol (IP) gaining popularity with customers, it is now possible to use IP via the Internet (or an intranet) to deliver wireless voice services, also known as Voice-over-IP (VoIP). Next generation cellular networks, public land mobile networks (PLMNs) and public switched telephone networks (PSTNs) most likely will be implemented using IP networks. In IP networks, it is critical to best utilize system resources and reduce delays.

One of the key challenges for wireless systems using VoIP is the issue of delay. The encoding and decoding of voice into digital data (also known as "vocoding") can introduce substantial delay into VoIP. The introduction of vocoding delays has been a major hindrance to the deployment of VoIP.

Moreover, significant cost savings can be realized by the elimination of specialized vocoder hardware. For example, a typical single-mode handset requires a vocoder that costs approximately $5 (and provides about 20 MIPs of processing power), while a typical dual-mode handset requires two vocoders. The cost of a vocoder is roughly the same cost as a processor for a handset (which only needs about 5 MIPS of processing power). One way to reduce costs is to eliminate hardware-based vocoders, and have the processor perform some of the functions of the vocoder. Moreover, this allows handsets to be smaller and less complex.

SUMMARY OF THE INVENTION

To overcome the limitations in the prior art described above, and to overcome other limitations that will become apparent upon reading and understanding the present specification, the present invention discloses a method for reducing vocoding conversions by dynamically loading a software-defined vocoder into a handset. The software-defined vocoder may be selected based on the calling party's network type, wherein a notification of network type is transmitted to the called party's network during call setup. The software-defined vocoders may be stored in the network and downloaded into the handset, or the software-defined vocoders may be stored in the handset itself.

BRIEF DESCRIPTION OF THE DRAWINGS

Referring now to the drawing in which like reference numbers represent corresponding parts throughout.

DETAILED DESCRIPTION OF THE PREFERRED EMBODIMENT

In the following description of the preferred embodiment, reference is made to the accompanying drawings that form a part hereof, and in which is shown by way of illustration a specific embodiment in which the invention may be practiced. It is to be understood that other embodiments may be utilized and structural changes may be made without departing from the scope of the present invention.

Overview

The present invention reduces vocoding conversions between different networks, such as between cellular networks, public land mobile networks (PLMNs), public switched telephone networks (PSTNs), and Internet Protocol (IP) networks. Specifically, the present invention tunnels voice data from the originating handset and the originating network, through different networks, to the destination network and destination handset, without any vocoding conversions, except at the handsets.

To accomplish this, the following steps are performed. After the calling party dials the called party, the called party's network is notified that the calling party is calling from a particular type of network. In one embodiment, the called party's network may load an associated software-defined vocoder into the called party's handset in response to this notification.

This provides more efficient use of available bandwidth and vocoding resources, and reduces potential delays that may occur for inter-network communications. As such, the invention is a key enabler of wireless VoIP applications.

Environment

Figure 1A:
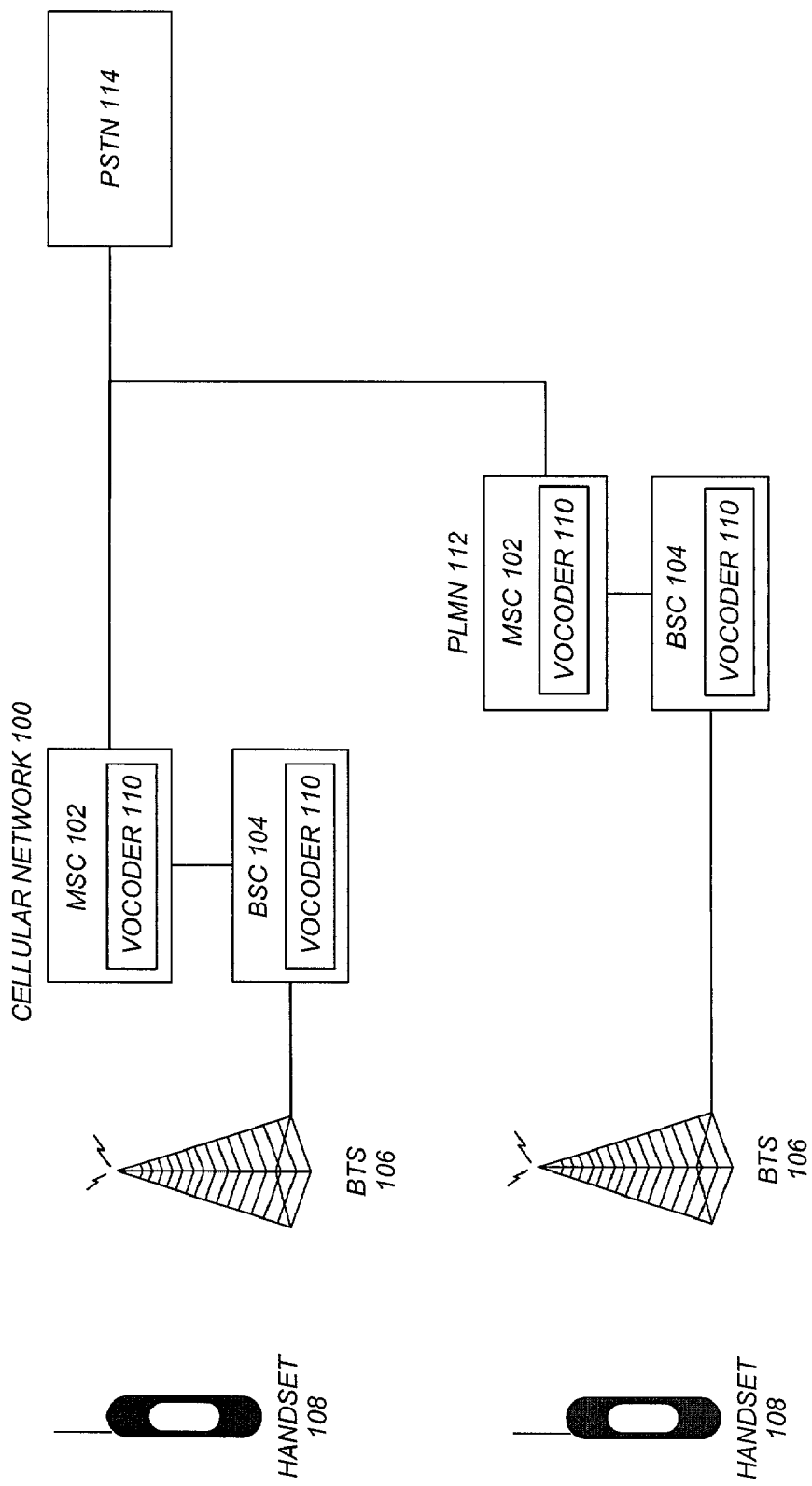
FIGS. 1A, 1B, and 1C illustrate exemplary network configurations that could be used to implement inter-network communications.
Figure 1B:
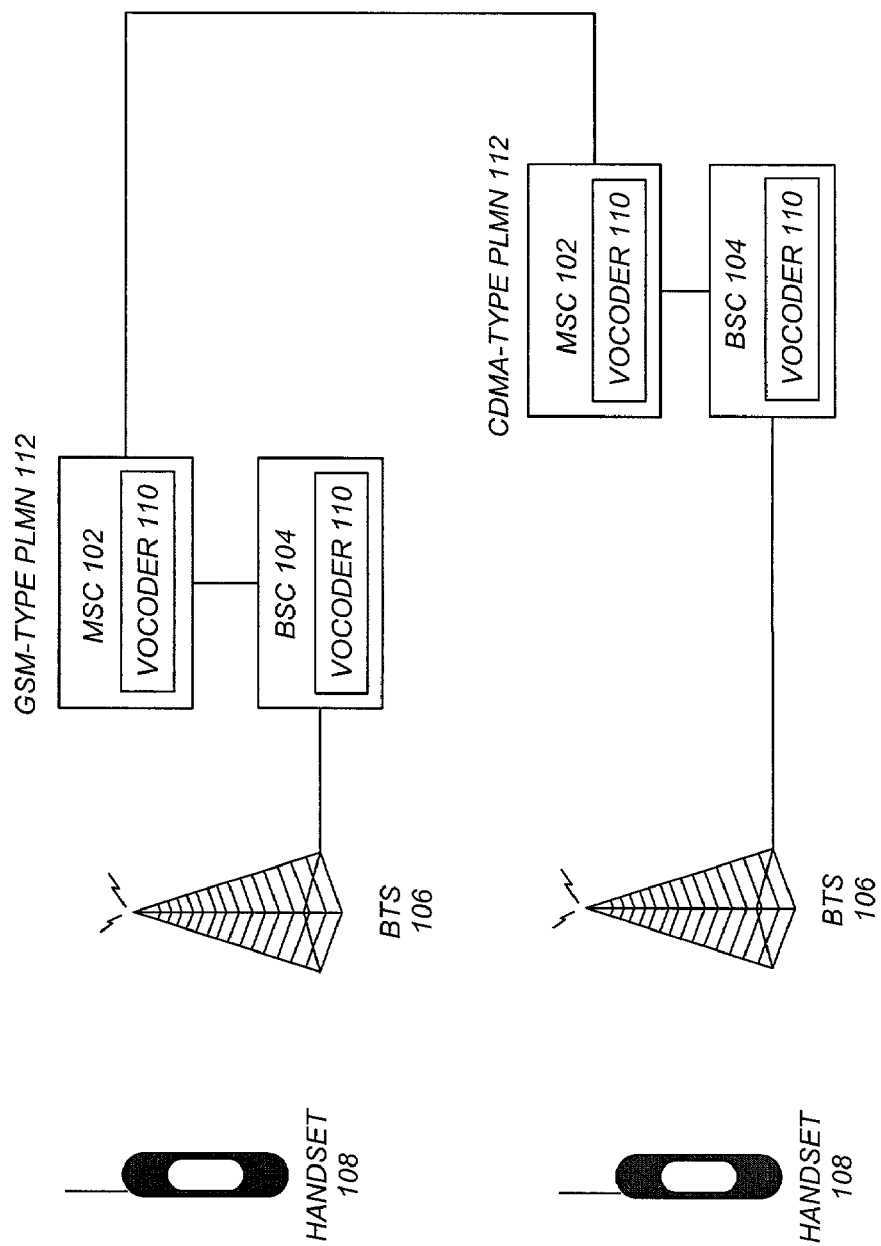
Figure 1C:
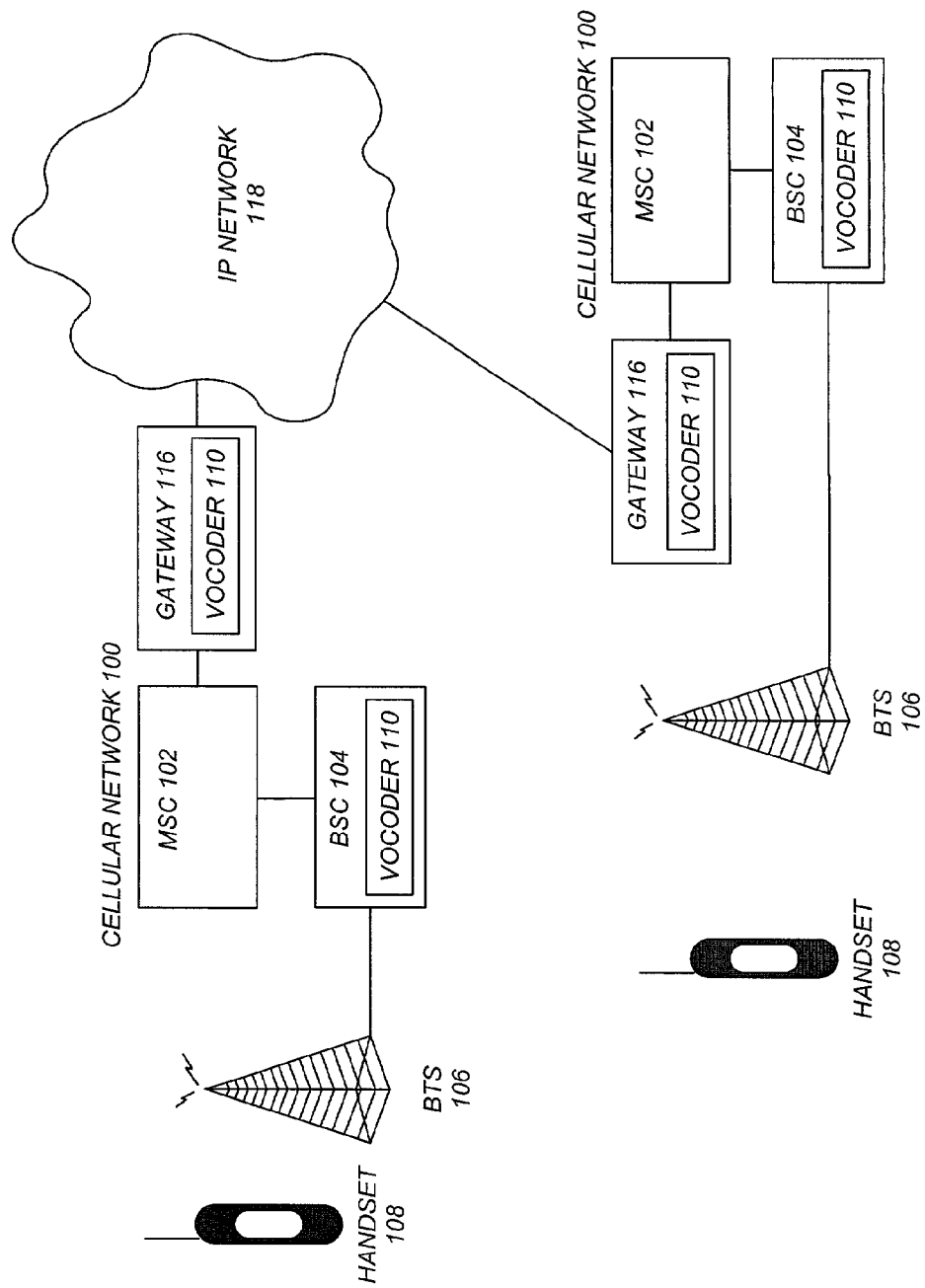

FIGS. 1A, 1B, and 1C illustrate exemplary network configurations that could be used to provide inter-network communications. Each of these configurations may be comprised of interconnected cellular networks (e.g., AMPS, GSM, TDMA, or CDMA cellular networks), public land mobile networks (PLMNs), public switched telephone networks (PSTNs), and Internet Protocol (IP) networks.

In the example of FIG. 1A, a cellular network 100 includes at least one MSC (Mobile Switching Center) 102, at least one BSC (Base Station Controller) 104, and at least one BTS (Base Transceiver Station) 106 for communicating with one or more handsets 108 or other transceivers. The BSC 104 includes a vocoder 110 for encoding and decoding voice signals received from and sent to the handset 108.

The MSC 102 of the cellular network 100 connects to both a PSTN 110, as well as a MSC 102 of a PLMN 112. Like the cellular network 100, the PMLN 112 includes at least one MSC 102, at least one BSC 104, at least one BTS 106 for communicating with one or more handsets 108 or other transceivers.

Both the cellular network 100 and the PMLN 112 also include a vocoder 110 in their respective MSCs 102 for converting the voice data to/from the format of the other network. This additional vocoder introduces significant delay into inter-network communications.

In the example of FIG. 1B, the MSC 102 of a GSM-type PMLN 112 connects to the MSC 102 of a CDMA-type PLMN 112. Both the GSM-type PMLN 112 and the CDMA-type PMLN 112 include a vocoder 110 in their respective MSCs 102 for converting the voice data to/from the format of the other network. Again, this additional vocoder introduces significant delay into inter-network communications.

Finally, in the example of FIG. 1C, the MSCs 102 of two different cellular networks 100 each connects to a separate VoIP Gateway 116 that interfaces into an IP network 118. In this manner, the cellular networks 100 communicate across the IP network 118. Both cellular networks 100 include a vocoder 110 in their respective VoIP Gateways 116 for converting the voice data to/from the format of the other network. Like the other configurations, this additional vocoder introduces significant delay into inter-network communications.

Figure 2:
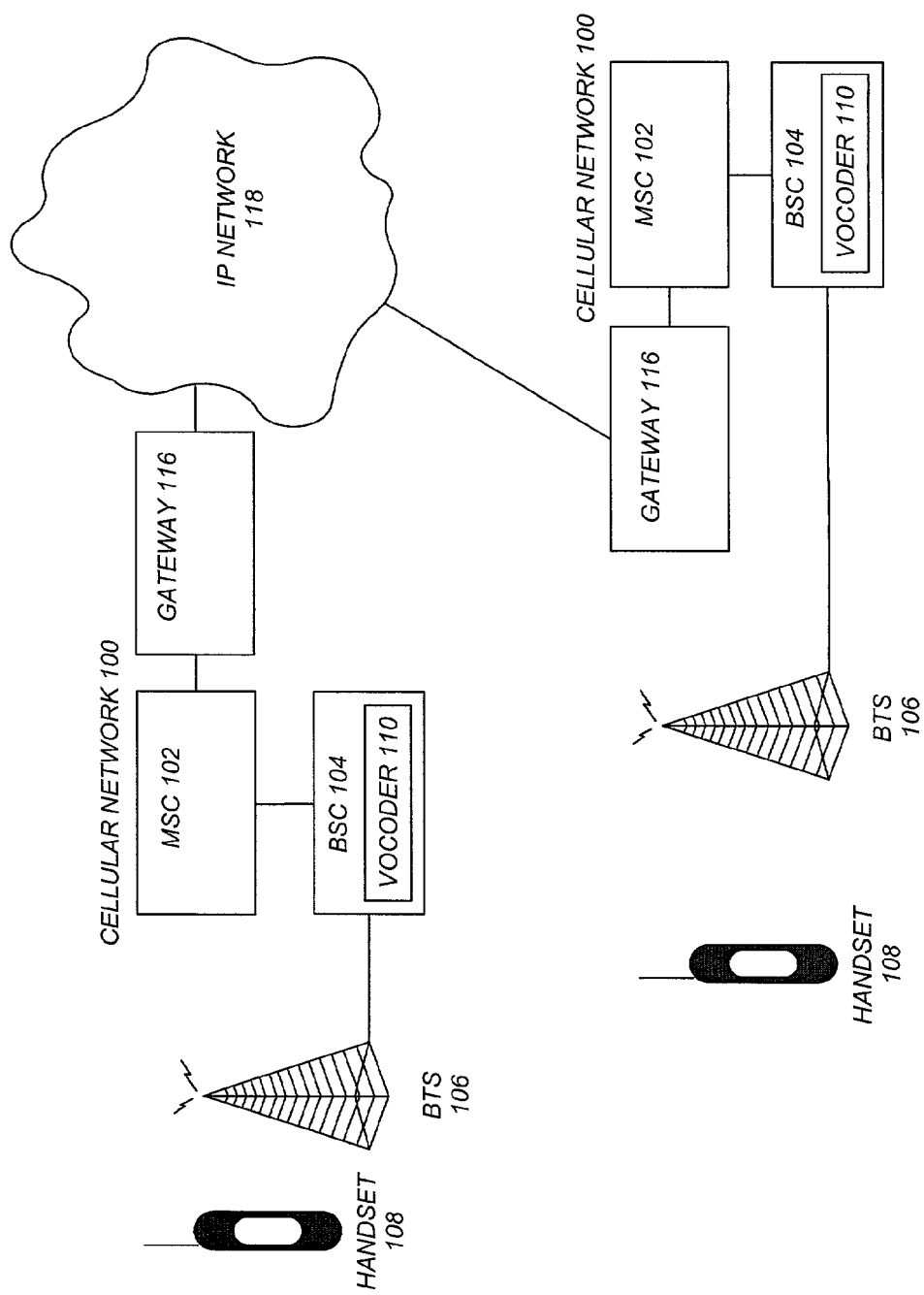
FIG. 2 illustrates an exemplary network configuration that uses software-defined vocoders according to the preferred embodiment of the present invention.

FIG. 2 illustrates an exemplary network configuration that uses software-defined vocoders according to the preferred embodiment of the present invention. This exemplary network configuration is similar to FIG. 1C, in that the MSCs 102 of two different cellular networks 100 each connects to a separate VoIP Gateway 116 that interfaces into an IP network 118, so that the cellular networks 100 can communicate across the IP network 118.

However, the cellular networks 100 in this embodiment do not include a vocoder 110 in their respective VoIP Gateways 116 for converting the voice data to/from the format of the other network. Instead, one or more software-defined vocoders 110 are stored in the BSC 104 and then downloaded into the handset 108 for encoding and decoding voice signals sent to or received from the handset 108. Voice data is tunneled from the originating handset and the originating network, through different networks, to the destination network and destination handset, without any vocoding conversions, except at the handsets. This configuration eliminates any vocoder delay introduced by inter-network communications.

According to the preferred embodiment of the present invention, after the calling party dials the called party, the called party's network 100 is notified that the calling party is calling from a particular type of network 100. From this signaling, the called party's network 100 can determine how the handset 108 should handle the call.

In the preferred embodiment, the BSC 104 of the called party's network 100 preferably maintains one or more software-defined vocoders 110 in local storage. Upon receipt of the notification that the calling party is calling from a particular type of network 100, the BSC 104 downloads an associated software-defined vocoder 110 into the handset 108.

Figure 3:
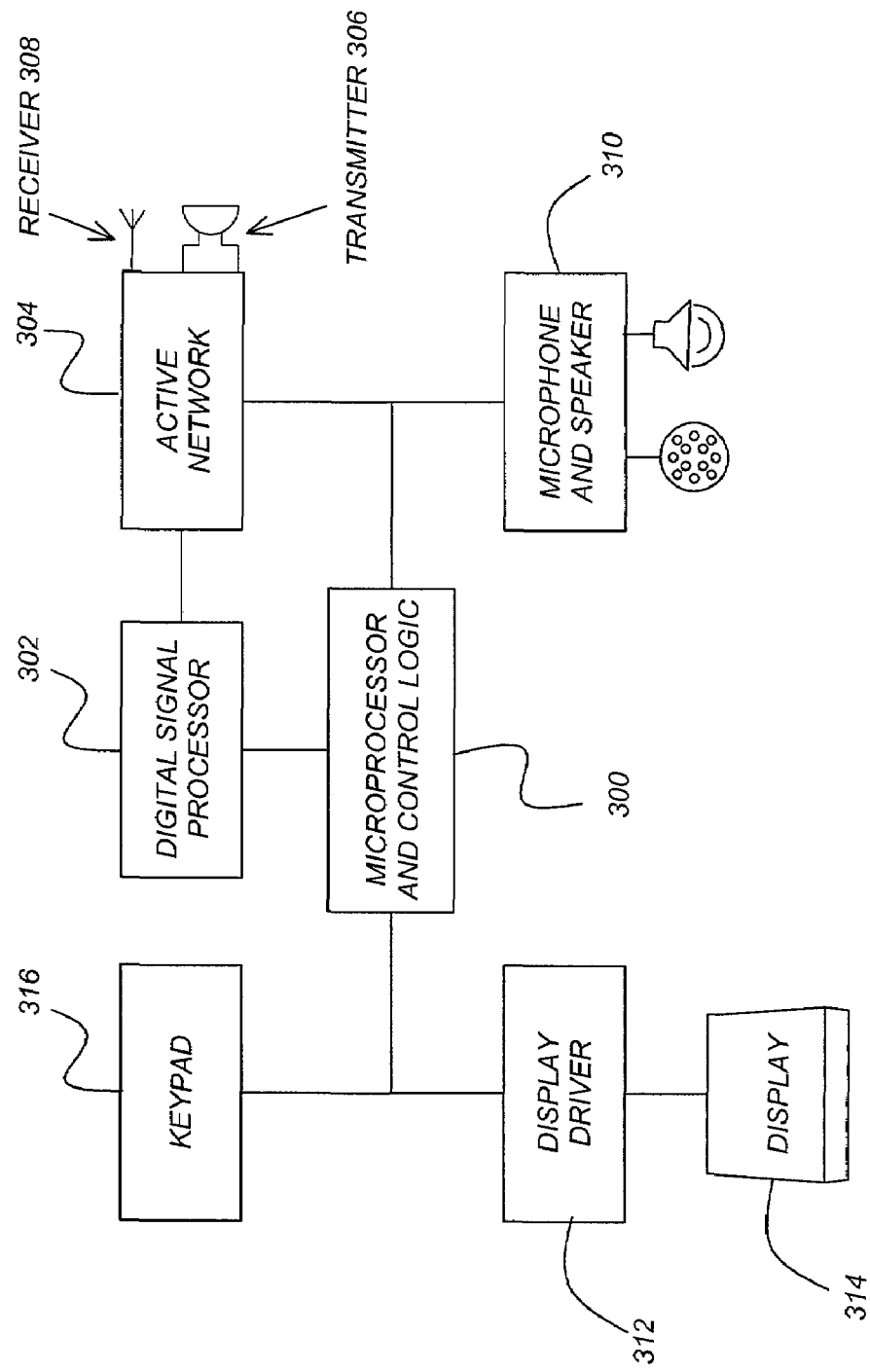
FIG. 3 illustrates the structure of a handset that uses software-defined vocoders according to the preferred embodiment of the present invention.

FIG. 3 is a block diagram of an exemplary embodiment of a handset 108. Of course, those skilled in the art will recognize that this embodiment is provided for illustration purposes and is not intended to limit the present invention to exact structure shown. Indeed, those skilled in the art will recognize that other components and structures may be used for the handset 108 without departing from the scope of the present invention.

The handset 108 is usually comprised of a microprocessor and associated control logic 300, digital signal processor (DSP) 302, active network 304 for radio frequency (RF) transmissions that includes a transmitter 306 and receiver 308, microphone and speaker 310, display driver 312 and display 314, and keypad 316. In essence, the present invention provides a "universal vocoder" concept, wherein vocoders 110 are downloaded into the DSP 302 and alter the way that voice data is encoded and decoded. Thereafter, the voice data is transmitted in its original vocoding format, while it tunnels from the originating handset and the originating network, through different networks, to the destination network and destination handset, without further conversions or decoding, until it reaches the receiving end of the connection, i.e., the called party's handset 108, at which point the voice data is de-vocoded.

As a result, the present invention integrates signaling between wireline and wireless networks, so that wireless voice can be tunneled through different networks without any unnecessary vocoding and conversions, except at the handsets 108. This enables more efficient use of available bandwidth and vocoding resources, and reduces possible delays introduced by vocoding.

Logic

Figure 4:
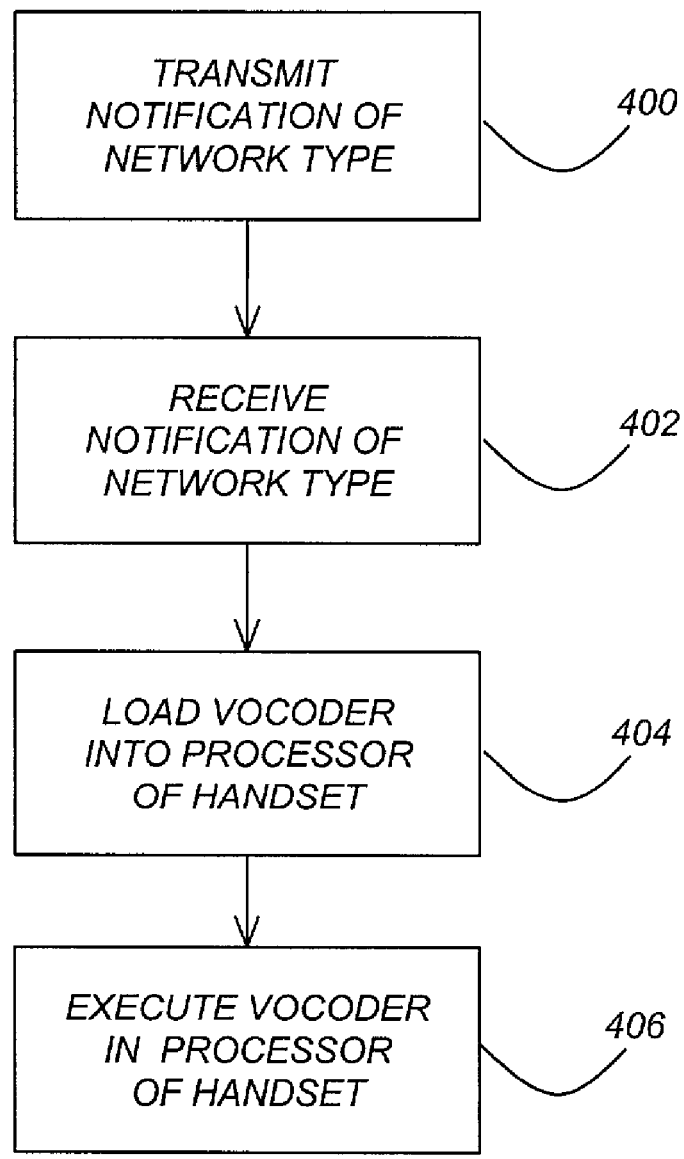
FIG. 4 is a flowchart that illustrates the logic of the preferred embodiment of the present invention.

FIG. 4 is a flow chart illustrating the logic of the preferred embodiment of the present invention.

Block 400 represents a notification being transmitted from a calling party's network to a called party's network. This notification indicates that the calling party's network is a particular type of network. Preferably, this notification is transmitted at call setup, although it may be transmitted at other times as well.

Block 402 represents the notification being received at the called party's network.

Block 404 represents a software-defined vocoder 110 being loaded into a processor of the called party's handset 108 based on the transmitted and received notification. In one embodiment, the software-defined vocoder 110 is stored in a component of the called party's network and is downloaded from the component into a processor of the called party's handset 108. In another embodiment, the software-defined vocoder 110 is stored in a component of the called party's handset 108 and is loaded from the component into the processor of the called party's handset 108. In both embodiments, it is expected that a plurality of different vocoders 110 will be available for loading into the processor of called party's handset 108.

Block 406 represents the software-defined vocoder 110 being executed by the processor of the called party's handset 108, wherein the software-defined vocoder 110 translates voice data tunneled from the calling party's handset 108 and the calling party's network 100, through any number of different networks 100, to the called party's network 100 and called party's handset 108, without any vocoding conversions, except at the handsets 108.

CONCLUSION

This concludes the description of the preferred embodiment of the invention. The following describes some alternative embodiments for accomplishing the present invention.

Although the software-defined vocoders 110 are shown in FIG. 2 as being used in when communicating between cellular networks 100 across an IP network 118, other network configurations could use the software-defined vocoders as well. For example, the software-defined vocoders 110 could be used in the network configurations of FIGS. 1A, 1B, 1C, or any other network configurations. Moreover, the software-defined vocoders 110 could be used by a single network, and do not require inter-network communications.

In another embodiment, any number of different signaling schemes could be used to determine which software-defined vocoder 110 should be downloaded into a handset 108. Those skilled in the art will recognize that the particular type of notification is not as important as the information being conveyed.

In yet another embodiment, handsets 108 need not be used. Although the preferred embodiment is described in conjunction with handsets 108, those skilled in the art will recognize that any transceiver device could be used in place of the handsets 108.

In still another embodiment, the software-defined vocoders 110 could be stored other than in components of the network. For example, those skilled in the art will recognize that a plurality of vocoders 110 could be stored in the handset 108 or other transceiver device, e.g., in some memory device therein.

In an alternative embodiment, the software-defined vocoders 110 could be loaded into the handset 108 or other transceiver device in order to provide multi-mode operation. For example, the handset 108 may always load a software-defined vocoder 110, e.g., for normal operation, rather than just for inter-network communication.

In summary, the present invention discloses a method for reducing vocoding conversions by dynamically loading a software-defined vocoder into a handset. The software-defined vocoder may be selected based on the calling party's network type, wherein a notification of network type is transmitted to the called party's network during call setup. The software-defined vocoders may be stored in the network and downloaded into the handset, or the software-defined vocoders may be stored in the handset itself.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for tunneling voice data over one or more networks, comprising:
   (a) transmitting a notification to a called party's network that a calling party's handset is calling from a particular type of network; and
   (b) loading one of a plurality of software-defined vocoders into the called party's handset based on the transmitted notification, wherein the loaded software-defined vocoder, when executed by the called party's handset, translates voice data communicated between the calling party's handset and the called party's handset.

2. The method of claim 1, wherein the voice data is tunneled from the calling party's handset and the calling party's network, through any number of different networks, to the called party's network and called party's handset, without any vocoding conversions, except at the handsets.

3. The method of claim 1, wherein the software-defined vocoder is stored on a component of the called party's network and is downloaded from the component to the called party's handset.

4. The method of claim 1, wherein the notification is transmitted during call setup.

5. An apparatus for tunneling voice data over one or more networks, comprising:
   (a) means for transmitting a notification to a called party's network that a calling party's handset is calling from a particular type of network; and
   (b) means for loading one of a plurality of software-defined vocoders into the called party's handset based on the transmitted notification, wherein the loaded software-defined vocoder, when executed by the called party's handset, translates voice data communicated between the calling party's handset and the called party's handset.

6. The apparatus of claim 5, wherein the voice data is tunneled from the calling party's handset and the calling party's network, through any number of different networks, to the called party's network and called party's handset, without any vocoding conversions, except at the handsets.

7. The apparatus of claim 5, wherein the software-defined vocoder is stored on a component of the called party's network and is downloaded from the component to the called party's handset.

8. The apparatus of claim 5, wherein the notification is transmitted during call setup.

9. A method for tunneling voice data over one or more networks, comprising:
   (a) receiving a notification from a calling party's network that it is a particular type of network; and
   (b) loading one of a plurality of software-defined vocoders into a called party's handset based on the received notification, wherein the loaded software-defined vococler, when executed by the called party's handset, translates voice data communicated between the calling party's handset and the called party's handset.

10. The method of claim 9, wherein the voice data is tunneled from the calling party's handset and the calling party's network, through any number of different networks, to the called party's network and called party's handset, without any vocoding conversions, except at the handsets.

11. The method of claim 9, wherein the software-defined vocoder is stored on a component of the called party's network and is downloaded from the component to the called party's handset.

12. The method of claim 9, wherein the notification is transmitted during call setup.

13. An apparatus for tunneling, voice data over one or more networks, comprising:
   (a) means for receiving a notification from a calling party's network that it is a particular type of network; and
   (b) means for loading one of a plurality of software-defined vocoders into a called party's handset based on the received notification, wherein the loaded software-defined vocoder, when executed by the called party's handset, translates voice data communicated between the calling party's handset and the called party's handset.

14. The apparatus of claim 13, wherein the voice data is tunneled from the calling party's handset and the calling party's network, through any number of different networks, to the called party's network and called party's handset, without any vocoding conversions, except at the handsets.

15. The apparatus of claim 13, wherein the software-defined vocoder is stored on a component of the called party's network and is downloaded from the component to the called party's handset.

16. The apparatus of claim 13, wherein the notification is transmitted during call setup.

17. A method for tunneling voice data over one or more networks, comprising:
  (a) loading one of a plurality of vocoders into a processor of a called party's handset, wherein the loaded vocoder is selected based on a notification of a particular type of network communicating with a calling party's handset; and
  (b) executing the loaded vocoder in the processor of the called party's handset, wherein the vocoder translates voice data communicated to the called party's handset from the calling party's handset.

18. The method of claim 17, wherein the voice data is tunneled from the calling party's handset and the calling party's network, through any number of different networks, to the called party's network and the called party's handset, without any vocoding conversions, except at the handsets.

19. The method of claim 17, wherein the vocoder is stored on a component of the handset and is loaded into the processor from the component.

20. The method of claim 17, wherein the vocoder is stored on a network component and is downloaded from the network component into the processor of the handset.

21. An apparatus for tunneling voice data over one or more networks, comprising:
  (a) means for loading one of a plurality of vocoders into a processor of a called party's handset, wherein the loaded vocoder is selected based on a notification of a particular type of network commUnicating with calling party's handset; and
  (b) means for executing the loaded vocoder in the processor of the called party's handset, wherein the vocoder translates voice data communicated to the called party's handset from the calling party's handset.

22. The apparatus of claim 21, wherein the voice data is tunneled from the calling party's handset and the calling party's network, through any number of different networks, to the called party's network and the called party's handset, without any vocoding conversions, except at the handsels.

23. The apparatus of claim 21, wherein the vocoder is stored on a component of the handset and is loaded into the processor from the component.

24. The apparatus of claim 21, wherein the vocoder is stored on a network component and is downloaded from the network component into the processor of the handset.

* * * * *